US005665153A

United States Patent [19]

Desaix et al.

[11] Patent Number: 5,665,153
[45] Date of Patent: Sep. 9, 1997

[54] BITUMEN COMPOSITIONS

[75] Inventors: Jean-Claude Desaix; Marie-Francoise Morizur; Denis Rabiot, all of Grand Couronne, France

[73] Assignee: Shell Oil Company, Houston, Tex.

[21] Appl. No.: 561,500

[22] Filed: Nov. 20, 1995

[30] Foreign Application Priority Data

Nov. 21, 1994 [EP] European Pat. Off. ............. 94402657

[51] Int. Cl.$^6$ ..................................................... C09D 195/00
[52] U.S. Cl. ........................................ 106/273.1; 106/277
[58] Field of Search ................................. 106/273.1, 277

[56] References Cited

U.S. PATENT DOCUMENTS

| 3,412,111 | 11/1968 | Irwin et al. | 260/346.8 |
| 4,691,030 | 9/1987 | Fujino | 549/255 |

FOREIGN PATENT DOCUMENTS

| 0496437 | 4/1987 | European Pat. Off. ........ A61K 31/44 |

OTHER PUBLICATIONS

DeSaix et al, "Bitumen compositions . . . ", CA 125:93910 Nov. 21, 1994.
Higgins et al, "Bitumen compositions . . . ", CA 117:238802 Aug. 26, 1992.
Satake et al, "Polymers containing . . . ", CA 110:40218 Aug. 29, 1988.
Moriyama et al, "Preparation of Ultra-heavy . . . ", CA 115:186619 Apr. 23, 1991.

*Primary Examiner*—David Brunsman
*Attorney, Agent, or Firm*—Kim Muller

[57] ABSTRACT

Bitumen compositions comprising bitumen and at least one succinic anhydride derivative contained in the bitumen, processes for their preparation and their use in bitumen emulsions for road applications, e.g. surface dressings.

5 Claims, No Drawings

BITUMEN COMPOSITIONS

FIELD OF THE INVENTION

The present invention relates to bitumen compositions, their preparation, and their use in bitumen emulsions for road applications, e.g. surface dressings.

BACKGROUND OF THE INVENTION

Bitumens used for road applications may have different origins. Venezuelan crude oils that naturally contain acidic molecules (naphthenic acids) are considered as having good qualities for manufacturing bitumen emulsions. Crude oils from other sources, e.g. Middle East oils, do not contain these acids. However, it is known to add (and incorporate) naphthenic acids to non-naphthenic bitumens in order to try to attain the quality of naphthenic bitumens. EP 416,682 discloses bitumen compositions comprising bitumen and at least one polymerized fatty acid contained in the bitumen and their use in bitumen emulsions for surface dressing applications suitable for roads.

SUMMARY OF THE INVENTION

It has now been found that bitumen compositions having surprisingly enhanced properties can be obtained by incorporating a succinic anhydride derivative into bitumens. According to the present invention there is provided a bitumen composition comprising bitumen and at least one succinic anhydride derivative incorporated in the bitumen.

DETAILED DESCRIPTION OF THE INVENTION

Succinic anhydride derivatives which have been found to be particularly useful are mono- or poly-alkenes on to which have been grafted one or more succinic anhydride functions (i.e. maleinated).

Preferred alkenes are those having a chain length of 12 to 40 carbon atoms, particularly 1-alkenes and polyalkenes. Particularly preferred are 1-alkenes having a chain length of 14 to 19 carbon atoms, and polyisobutylene. When the succinic anhydride derivative is a maleinated polyisobutylene it preferably has a molecular weight from 500 to 2500.

Such succinic anhydride derivatives can be obtained by any suitable known method, for example, by the processes described in U.S. Pat. No. 3,412,111 or U.S. Pat. No. 4,691,030.

The at least one succinic anhydride derivative is preferably present in an amount of at least 0.1% weight (w) based on the bitumen, preferably an amount in the range of about 0.1% to about 1% w of the bitumen, more preferably an amount in the range of about 0.1% to about 0.5% of the bitumen.

The present invention also provides a process for preparing a bitumen composition of the present invention which process comprises incorporating the at least one succinic anhydride derivative into the bitumen, conveniently by mixing the succinic anhydride derivative directly into molten bitumen. The bitumen may be any bitumen, but the advantages of the present invention are most clearly attained when the bitumen is a non-naphthenic bitumen, as will readily be appreciated by those skilled in the art.

Emulsions for road applications, e.g. surface dressings, may readily be prepared from bitumen compositions of the invention, in known manner.

The present invention thus further includes the use of bitumen compositions according to the present invention in a bitumen emulsion for surface dressings suitable for road applications.

The present invention will be further understood from the following illustrative Examples, in which parts and percentages are by weight unless otherwise indicated.

EXAMPLES

Various doped bitumens were prepared based on two 200 penetration bitumens, that is, industrially produced non-naphthenic bitumens (Bitumens A and B) which were each prepared from different crude oils.

The bitumens were doped by adding agents to the molten bitumens while stirring until homogeneous.

Emulsions containing about 65% bitumen were prepared in conventional manner from the above bitumens, by introducing bitumen (at 140° C.) into a colloid mill together with an aqueous phase containing hydrochloric acid and emulsifier (N-alkyl(tallow) propylene diamine—"DINORAM S" ex. CECA, France (DNS)).

Various properties of the bitumens (adhesivity) and of the emulsions (e.g. viscosity, breaking behavior) were measured, and the results are given in Tables 1 to 4 following, in which:

P is a maleinated polyisobutylene having a molecular weight of 1000 and a P-value (number of potential acidic sites) of 3.5;

Q is a maleinated polyisobutylene having a molecular weight of 1000 and a P-value of 2;

R is a maleinated 1-alkene having a hydrocarbon chain length of 14 carbon atoms;

S is a maleinated 1-alkene having a hydrocarbon chain length of 16 carbon atoms;

T is a maleinated 1-alkene having a hydrocarbon chain length of 18 carbon atoms;

U is a blend of maleinated 1-alkenes having hydrocarbon chain lengths from 15 to 19 carbon atoms;

V is a blend of maleinated 1-alkenes having hydrocarbon chain lengths from 15 to 19 carbon atoms;

W is a blend of maleinated 1-alkenes, 25% having a hydrocarbon chain length of 14 carbon atoms, 50% having a hydrocarbon chain length of 16 carbon atoms and 25% having a hydrocarbon chain length of 18 carbon atoms;

and

C is a polymerized fatty acid ("PRIPOL 1017") ex. Unichema International, UK) used for purposes of comparison

TABLE 1

| BITUMEN 200 DOPE | 0% | A C 0.5% | P 0.1% | P 0.5% | Q 0.25% |
|---|---|---|---|---|---|
| penetration at 15°C. | 48 | 50 | 51 | 55 | 56 |
| penetration at 25°C. | 187 | 191 | 179 | 182 | 181 |
| Acid number | 0 | 1.1 | 0.1 | 0.6 | |
| Adhesivity | | | | | |
| quartzite | 0 | 25 | 50 | 25 | 25 |
| flint | 50 | 75 | 75 | 75 | 25 |
| limestone | 50 | 90 | 75 | 75 | 90 |
| diorite | 25 | 50 | 25 | 90 | 50 |
| EMULSION | | Emulsifier: 0.43% | | | |
| Water Phase | | HC1 => pH = 2.5 | | | |
| bitumen content % | 64.8 | 64.8 | 66.0 | 65.8 | 65.7 |
| pH | 3.4 | 3.2 | 3.2 | 2.7 | 3.1 |
| viscosity (mPa.s) | 183 | 231 | 238 | 173 | 129 |
| breaking properties | | | | | |
| IREC | 90 | 70 | 75 | 35 | 85 |
| SMS 210 m | 2.5 | 13.3 | 6.6 | 12.0 | 11.2 |
| GBI | 44 | 75 | 64 | 89 | 66 |
| seive residues | | | | | |
| 630 μm% | <0.1 | <0.1 | <0.1 | | <0.1 |
| 160 μm% | <0.1 | <0.1 | <0.1 | | <0.1 |
| 63 μm% | 1.0 | 0.2 | 0.4 | | 0.3 |
| 38 μm% | 5.5 | 1.5 | 0.7 | | 0.4 |
| storage stability | | | | | |
| decantation % | | 0.8 | | | |
| sedimentation % | 2.3 | 2.9 | | | 6.3 |

TABLE 3

| BITUMEN 200 DOPE | 0% | B C 0.7% | V 0.25% | V 0.4% | Q 0.5% |
|---|---|---|---|---|---|
| penetration at 15°C. | 51 | | | | |
| penetration at 25°C. | 184 | | 183 | | 178 |
| Acid number | | 1.4 | 0.8 | 1.1 | 1.2 |
| Adhesivity | | | | | |
| quartzite | 0 | 75 | 25 | | 25 |
| flint | 50 | 90 | 75 | | 75 |
| limestone | 50 | 100 | 75 | | 75 |
| diorite | 75 | 90 | 75 | | 75 |
| EMULSION | | Emulsifier: 0.43% | | | |
| Water Phase | | HC1 => pH = 2.5 | | | |
| bitumen content % | 65.00 | 64.70 | 65.00 | 65.10 | 65.50 |
| pH | 3.5 | 2.7 | 2.9 | 2.8 | 2.6 |
| viscosity (mPa.s) | 53 | 49 | 54 | 61 | 68 |
| breaking properties | | | | | |
| IREC | 120 | 100 | 85 | 75 | 45 |
| SMS 210 m | 1.2 | 12.0 | 2.3 | 9.0 | 21.5 |
| GBI | 21 | 60 | 45 | 68 | 92 |
| seive residues | | | | | |
| 630 μm% | <0.1 | <0.1 | <0.1 | | <0.1 |
| 160 μm% | <0.1 | | <0.1 | | <0.1 |
| 63 μm% | 0.6 | | 1.0 | | 0.6 |
| 38 μm% | 2.3 | | 2.9 | | 2.1 |
| storage stability | | | | | |
| decantation % | 1.5 | | 2.0 | | 0.8 |
| sedimentation % | 9.7 | | 13.2 | | 5.8 |

TABLE 2

| BITUMEN 200 DOPE | 0% | C 0.5% | R 0.1% | S 0.1% | S 0.5% | T 0.1% | U 0.1% | U 0.5% |
|---|---|---|---|---|---|---|---|---|
| penetration at 15°C. | 48 | 50 | 53 | 50 | 56 | 50 | 53 | 56 |
| penetration at 25°C. | 187 | 191 | 167 | 182 | 190 | 167 | 180 | 187 |
| Acid number | 0 | 1.1 | 0.6 | 0.3 | 1.7 | | 0.3 | 1.6 |
| Adhesivity | | | | | | | | |
| quartzite | 0 | 25 | 0 | 50 | 25 | 0 | 50 | 25 |
| flint | 50 | 75 | 25 | 50 | 75 | 25 | 25 | 75 |
| limestone | 50 | 90 | 50 | 75 | 75 | 50 | 75 | 75 |
| diorite | 25 | 50 | 25 | 25 | 90 | 25 | 25 | 90 |
| EMULSION | | Emulsifier: 0.43% | | | | | | |
| Water Phase | | HC1 => pH = 2.5 | | | | | | |
| bitumen content % | 64.8 | 64.8 | 65.0 | 65.2 | 65.5 | 65.1 | 66.2 | 65.0 |
| pH | 3.4 | 3.2 | 3.2 | 3.5 | 2.4 | 3.3 | 3.8 | 2.4 |
| viscosity (mPa.s) | 183 | 231 | 160 | 290 | | 172 | 238 | |
| breaking properties | | | | | | | | |
| IREC | 90 | 70 | 85 | 80 | 10 | 80 | 90 | 10 |
| SMS 210 m | 2.5 | 13.3 | 9.4 | 7.5 | 52 | 11.0 | 9.9 | breaking |
| GBI | 44 | 75 | 64 | 63 | 120 | 68 | 62 | |
| seive residues | | | | | | | | |
| 630 μm% | <0.1 | <0.1 | <0.1 | | | <0.1 | <0.1 | |
| 160 μm% | <0.1 | <0.1 | <0.1 | | | <0.1 | <0.1 | |
| 63 μm% | 1.0 | 0.2 | 0.3 | | | 0.2 | 0.3 | |
| 38 μm% | 5.5 | 1.5 | 2.1 | | | 1.5 | 1.6 | |
| storage stability | | | | | | | | |
| decantation % | | 0.8 | 0.8 | | | 0.8 | | |
| sedimentation % | 2.3 | 2.9 | 3.2 | | | 3.7 | | |

TABLE 4

| BITUMEN 200 DOPE | 0% | C 0.7% | B W 0.25% | W 0.4% | W 0.5% |
|---|---|---|---|---|---|
| penetration at 15°C. | 51 | | | | |
| penetration at 25°C. | 184 | | 170 | | 180 |
| Acid number | — | 1.4 | 0.8 | 1.1 | 1.2 |
| Adhesivity | | | | | |
| quartzite | 0 | 75 | | | |
| flint | 50 | 90 | | | |
| limestone | 50 | 100 | | | |
| diorite | 75 | 90 | | | |
| EMULSION | | Emulsifier: 0.43% | | | |
| Water Phase | | HCl => pH = 2.5 | | | |
| bitumen content % | 65.0 | 64.7 | 65.1 | 65.1 | 65.1 |
| pH | 3.5 | 2.7 | 2.5 | 2.8 | 2.6 |
| viscosity (mPa.s) | 53 | 49 | 48 | 60 | 68 |
| breaking properties | | | | | |
| IREC | 120 | 100 | 90 | 60 | 55 |
| SMS 210 m | 1.2 | 12.0 | 2.0 | 1.7 | 3.4 |
| GBI | 21 | 60 | 41 | 52 | 64 |
| seive residues | | | | | |
| 630 μm% | <0.1 | <0.1 | <0.1 | >0.1 | <0.1 |

In the above Tables 1 to 4 viscosity was measured in known manner using a dynamic viscometer Bohling V88 (25° C.; shear rate—150 sec$^{-1}$; time—30 min).

Adhesivity of the bitumen and breaking rates of the emulsions were tested as follows:

1. ADHESIVITY (LCPC Method)

The purpose of this test is to assess the adhesivity, in the presence of water, of a hydrocarbon binder coated on aggregate, and in it the displacement of bitumen by water on the surface of the aggregate is measured. In the test, bitumen-coated aggregate is plunged into water while hot, and the percentage of the surface covered by the binder after 16 hours' immersion at 60° C. is evaluated. The test is carried out with four type of reference aggregate, as indicated.

2. IREC break index

Reference fines (siliceous fines in the case of cationic emulsions) are poured continuously through a funnel at a rate of 0.3 to 0.5 g/s into a beaker containing 100 g of emulsion. The mixture is agitated constantly, and the addition of fines halted when the aggregate-emulsion system takes on the appearance of a block. The quantity of fines added to the 100 g of bitumen emulsion is called the break index.

3. SMS 210 m break index 10 g of aggregate (Corbigny porphyry, 2 to 4 mm) are placed in contact with an excess of emulsion (about 10 g) for 1 hour in an environment saturated with water in order to prevent any evaporation. The unbroken emulsion is removed with distilled water. After drying, the quantity of bitumen deposited is determined by weighing, and the result expressed in relation to 10 g of emulsion.

4. GBI (Global Breaking Index)

The results of the IREC and SMS 210 tests are combined to generate the global breaking index. This is defined by the relationship:

$$GBI=72.5-0.45 IREC+30.2 \log (SMS\ 210)$$

From the Tables, it is evident that the succinic acid derivatives significantly improved the breaking properties of the emulsions. In particular, it can be seen that the bitumen compositions of the present invention exhibit improved breaking properties when compared to the comparative compositions containing no dope (indicated in Tables 1 to 4 by "0%") and those containing "PRIPOL 1017" (indicated by "C" in Tables 1 to 4).

What is claimed is:

1. A bitumen composition comprising bitumen and at least one alkene having a carbon chain length of 12 to 40 carbon atoms to which has been grafted one or more succinic anhydride functions.

2. The bitumen composition of claim 1 wherein the grafted alkene is a blend of maleinated alkenes.

3. The bitumen composition of claim 2 wherein the grafted alkene is present in an amount of at least 0.1% weight based on the bitumen.

4. The composition according to claim 1 wherein the at least one alkene is a 1-alkene or a polyalkene.

5. The composition according to claim 4 wherein the at least one alkene is a 1-alkene having a chain length of 14 to 19 carbon atoms.

* * * * *